(12) United States Patent
Park (10) Patent No.: US 9,542,088 B2
(45) Date of Patent: Jan. 10, 2017

(54) DIGITAL DEVICE AND METHOD FOR CONTROLLING THE SAME THAT ENABLE TOUCH RECOGNITION FROM FRONT AND REAR SIDES OF THE DIGITAL DEVICE

(71) Applicant: LG ELECTRONICS INC., Seoul (KR)

(72) Inventor: Hyorim Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 506 days.

(21) Appl. No.: 13/791,402

(22) Filed: Mar. 8, 2013

(65) Prior Publication Data

US 2014/0223358 A1    Aug. 7, 2014

(30) Foreign Application Priority Data

Feb. 6, 2013  (KR) .................. 10-2013-0013511

(51) Int. Cl.

| *G06F 3/00* | (2006.01) |
| *G06F 9/00* | (2006.01) |
| *G06F 17/00* | (2006.01) |
| *G06F 3/0488* | (2013.01) |
| *G06F 3/0485* | (2013.01) |

(52) U.S. Cl.
CPC .......... *G06F 3/0488* (2013.01); *G06F 3/0485* (2013.01); *G06F 3/04855* (2013.01)

(58) Field of Classification Search
CPC .. G06F 3/0485; G06F 3/04855; G06F 3/0488; G06F 9/4443; G06F 8/34; G06F 3/0486; G06F 8/38; G06F 3/04812; G06F 3/04847; G06F 3/485; G06F 3/4833; H04N 1/00389; H04N 1/00411
See application file for complete search history.

(56) References Cited

U.S. PATENT DOCUMENTS

| 5,623,588 | A | * | 4/1997 | Gould ................ G06F 3/04855 345/157 |
| 6,384,845 | B1 | * | 5/2002 | Takaike ............. G06F 3/04855 715/784 |
| 2008/0158261 | A1 | * | 7/2008 | Gould ................ G06F 3/04855 345/666 |
| 2008/0178116 | A1 | | 7/2008 | Kim |
| 2010/0056220 | A1 | * | 3/2010 | Oh et al. ........................ 455/566 |
| 2010/0299596 | A1 | | 11/2010 | Zalewski et al. |
| 2011/0157055 | A1 | * | 6/2011 | Tilley et al. .................. 345/173 |
| 2013/0080471 | A1 | * | 3/2013 | Forte et al. ................... 707/785 |
| 2013/0132892 | A1 | * | 5/2013 | Lentz et al. ................... 715/786 |
| 2013/0141373 | A1 | * | 6/2013 | Takuma et al. ............... 345/173 |
| 2013/0322848 | A1 | * | 12/2013 | Li ........................... H04N 5/783 386/241 |

* cited by examiner

*Primary Examiner* — Kieu Vu
*Assistant Examiner* — Anita D Chaudhuri
(74) *Attorney, Agent, or Firm* — Birch, Stewart, Kolasch & Birch, LLP (57) ABSTRACT

A digital device and a method for controlling the same are disclosed, in which a scroll bar different from that provided when a user input for a front side is detected is provided to control the front side if a digital device, which enables double-sided touch recognition, detects a user input for a rear side.

20 Claims, 11 Drawing Sheets

DIGITAL DEVICE AND METHOD FOR CONTROLLING THE SAME THAT ENABLE TOUCH RECOGNITION FROM FRONT AND REAR SIDES OF THE DIGITAL DEVICE

Pursuant to 35 U.S.C. §119(a), this application claims the benefit of the Korean Patent Application No. 10-2013-0013511, filed on Feb. 6, 2013, which is hereby incorporated by reference as if fully set forth herein.

BACKGROUND OF THE INVENTION

Field of the Invention

The present specification relates to a digital device and a method for controlling the same, and more particularly, to a digital device and a method for controlling the same, in which a scroll bar different from that provided when a user input for a front side is detected is provided to control the front side if a digital device, which enables double-sided touch recognition, detects a user input for a rear side.

Discussion of the Related Art

With the development of the technology, various digital devices such as a smart TV, a smart phone, and a tablet PC have been generally used. Recently, a digital device operated in accordance with a touch input of a user has been widely used. In this case, if the digital device detects a touch input of a user, a scroll bar may be provided to scroll displayed contents in accordance with the touch input.

However, if the user intends to scroll contents displayed on a front side in accordance with a touch input for a rear side of the digital device, since the user cannot view a touch means (this is because that the touch means is located on the rear side) directly, a problem occurs in that it is difficult for the user to perform detailed scrolling.

In the meantime, if the digital device is a mobile device, it may provide a scroll bar by detecting a touch input of a user. However, the user of the digital device cannot control the scroll bar directly. In other words, the mobile device is only to scroll contents in accordance with the touch input of the user and thus display the scroll bar to allow the user to recognize that a portion currently viewed by the user corresponds to which portion of full contents. Accordingly, even though the user of the digital device performs the touch input for the scroll bar, the user cannot move the scroll bar and has no option but to scroll the contents. For this reason, the user may suffer inconvenience in that the user cannot move the scroll bar to scroll the contents quickly.

SUMMARY OF THE INVENTION

Accordingly, the present specification is directed to digital device and a method for controlling the same, which substantially obviate one or more problems due to limitations and disadvantages of the related art.

An object of the present specification is to provide a digital device and a method for controlling the same, in which a fine detail of contents may be controlled in case of a rear touch when a user intends to control contents displayed on a front side by performing the rear touch.

Another object of the present specification is to provide a digital device and a method for controlling the same, in which a scroll bar independent from the amount of contents is provided to delicately control the contents in case of a rear touch.

Other object of the present specification is to provide a digital device and a method for controlling the same, in which a user may intuitively know a scrolling speed through a size of a scroll bar.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a digital device that enables double-sided touch recognition comprises a display unit configured to display contents; a sensor unit configured to sense a user input and transferring a signal based on the sensed result to a processor; and the processor configured to control the display unit and the sensor unit, wherein the processor further configured to: activate a first scroll bar when a first input signal for a front side is detected, wherein the first scroll bar indicates a relative location of a displayed portion of entire contents and size of the first scroll bar is dependent on an amount of the contents, activate a second scroll bar when a second input signal for a rear side is detected, wherein the second scroll bar indicate a scrolling speed and a size of the second scroll bar is independent from the amount of the contents, deactivate the second scroll bar if the first scroll bar is activated, and deactivate the first scroll bar if the second scroll bar is activated.

In another aspect according to one embodiment, a method for controlling a digital device that enables double-sided touch recognition comprises the steps of displaying contents; activating a first scroll bar when a first input signal for a front side is detected, wherein the first scroll bar indicate a relative location of a displayed portion of entire contents and size of the first scroll bar is dependent on an amount of the contents; and activating a second scroll bar when a second input signal for a rear side is detected, wherein the second scroll bar indicate a scrolling speed and a size of the second scroll bar is independent from the amount of the contents, wherein the step of activating the first scroll bar includes deactivating the second scroll bar, and the step of activating the second scroll bar includes deactivating the first scroll bar.

According to one embodiment, if the digital device detects the touch input for the rear side of the user, it may adjust a scrolling speed based on the touch input for the rear side to be slower than a scrolling speed of a touch input for the front side. Accordingly, the user may roughly control the contents displayed by the touch input for the front side, and may delicately control the contents displayed by the touch input for the rear side.

Also, according to another embodiment, the digital device may provide a scroll bar independent from the amount of contents in response to the touch input for the rear side of the user. As a result, the user may intuitively know the scrolling speed through the size of the scroll bar.

Also, according to still another embodiment, if the user needs to delicately scroll the displayed contents, the user may control the digital device through the touch input for the rear side. In other words, the user may easily change the scrolling speed by switching the target (front side or rear side) for the touch input while maintaining one grip pattern.

Finally, according to further still another embodiment, the digital device may determine a touch sensing zone of the rear side in accordance with a grip pattern of the user for the digital device. Accordingly, the user may easily control the entire zone of the front side through a touch input for a given zone in accordance with the grip pattern.

More detailed advantageous effects will be described hereinafter.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts. The embodiments of the present specification shown in the accompanying drawings and described by the drawings are only exemplary, and technical spirits of the present specification and its main operation are not limited by such embodiments.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Although the embodiments will be described in detail with reference to the accompanying drawings and the disclosure described by the drawings, it is to be understood that the present specification is not limited by such embodiments.

Meanwhile, a digital device disclosed in this specification may include various types of digital devices such as a PC, a personal digital assistant (PDA), a notebook computer, a tablet PC, and a smart phone, which can display images and recognize double-sided touch. Also, in this specification, the digital device may include a touch screen.

Figure 1:
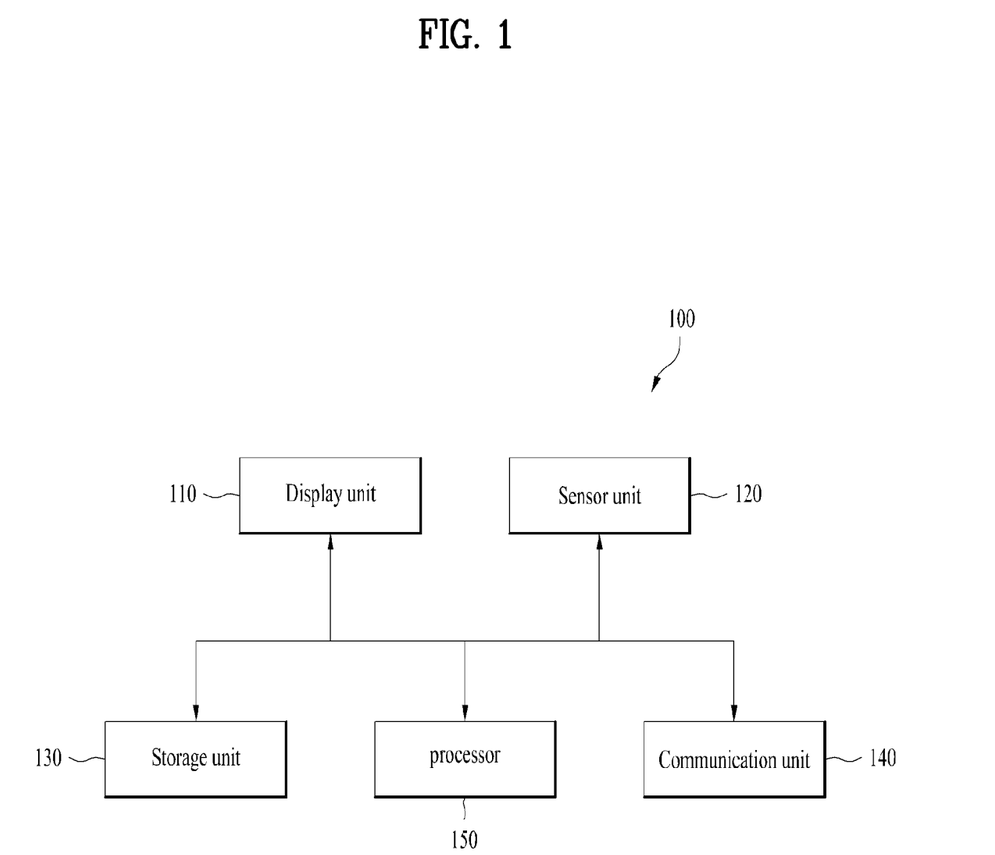
FIG. 1 is a block diagram illustrating functions of a digital device.

FIG. 1 is a block diagram illustrating functions of a digital device. FIG. 1 is only exemplary and some modules may be deleted or new modules may be additionally provided in accordance with the need of the person with ordinary skill in the art.

As shown in FIG. 1, a digital device 100 according to one embodiment may include a display unit 110, a sensor unit 120, a storage unit 130, a display unit 140, and a processor 150.

The display unit 110 outputs image data on a display screen. The display unit 110 may output an image on the basis of contents or applications implemented by the processor 150 or a control command of the processor 150. Also, the display unit 110 may be located on a front side of the digital device 100, or may display various tools such as a progress bar and a scroll bar for controlling contents which are displayed.

The sensor unit 120 may sense a peripheral environment of the digital device 100 by using at least one sensor provided in the digital device 100 and transfer the sensed result to the processor 150 in the form of a signal. Also, the sensor unit 120 may sense an input of a user and transfer an input signal based on the sensed result to the processor 150.

Accordingly, the sensor unit 120 may include at least one sensing means. According to one embodiment, the at least one sensing means may include a gravity sensor, a terrestrial magnetism sensor, a motion sensor, a gyroscope sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a global positioning system (GPS) sensor, a touch sensor, and a grip sensor.

Also, the sensor unit 120 refers to the aforementioned various sensing means, and may sense various inputs of the user and the environment of the digital device 100 and transfer the sensed result to the processor 150, whereby the processor 150 may perform the operation based on the sensed result. The aforementioned sensors may be included in the digital device 100 as separate elements or may be incorporated into at least one element.

Accordingly, according to one embodiment, the sensor unit 120 may sense a user input for a front side of the digital device 100 to be identified from a user input for a rear side of the digital device 100. In this case, the front side may be the side where the display unit 110 is provided in the digital device 110. However, if the display unit is provided in both sides, the front side may be defined as a side currently viewed by the user. At this time, the rear side is the side opposite to the front side.

Also, if the display unit 110 includes a touch sensitive display, it may sense a user input such as a touch input.

Accordingly, the processor 150 may recognize the signal based on the user input, which is transferred from the sensor unit 120 or the display unit 110, as an input signal, and may control the digital device 100 in accordance with the input signal.

In other words, the processor 150 may detect the input signal through the sensor unit 120 or the display unit 110 from the signals transferred from the units. Namely, the processor 150 may detect the signal generated by a user input, which is received from a specific sensor, from the signals which are received. For example, if the sensor unit 120 senses the user input for the front side or the rear side, the processor 150 may detect the input signal by using the sensed result.

Hereinafter, if each step or operation performed by the digital device starts or is performed through the user input, it is to be understood that the procedure of generating the input signal in accordance with the user input is included in the aforementioned description.

Also, it may be expressed that the processor controls the digital device or the units included in the digital device in accordance with the user input. The processor may be described to mean the digital device.

The storage unit 130 may store various digital data such as audio, photos, moving pictures, and applications. The storage unit 130 refers to various digital data storage areas, such as a flash memory, a random access memory (RAM), and a solid state drive (SSD).

Also, the storage unit 130 may temporarily store data received from an external device through the communication unit 140. At this time, the storage unit 130 may be used for buffering for outputting the data, which are received from the external device, from the digital device 100. Also, the storage unit 130 may store contents displayed in the digital device 100. In this case, the storage unit 130 may selectively be provided on the digital device 100.

The communication unit 140 may transmit and receive data to and from the external device by performing communication with the external device by using various protocols. Also, the communication unit 140 may transmit and receive digital data such as contents and applications to and from an external network by accessing the external network through wire or wireless.

In addition, although not shown in FIG. 1, the digital device may include audio input and output units or a power unit.

The audio output unit (not shown) includes an audio output means such as a speaker and earphone. Also, the audio output unit may output voice on the basis of contents implemented in the processor 150 or the control command of the processor 150. At this time, the audio output unit may selectively be provided on the digital device 100.

The power unit is a power source connected with a battery inside the device or an external power, and may supply the power to the digital device 100.

Also, the digital device 100 is shown in FIG. 1 as a block diagram. In FIG. 1, respective blocks are shown to logically identify the elements of the device. Accordingly, the aforementioned elements of the device may be provided as one chip or a plurality of chips in accordance with design of the device.

In the meantime, if the digital device according to one embodiment, which activates double-sided touch recognition, detects a user input for a rear side, it may provide a scroll bar different from that provided when a user input for a front side is detected.

Figure 2:
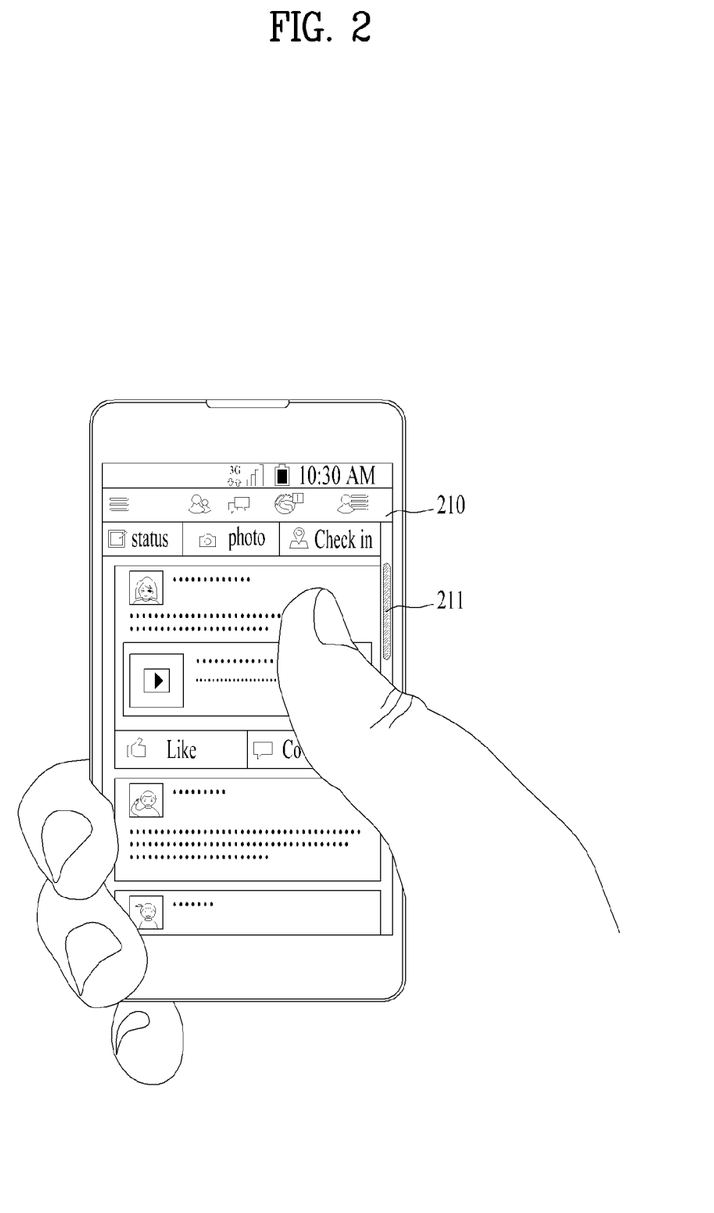
FIG. 2 is a diagram illustrating one embodiment of a first scroll bar displayed in a digital device.

FIG. 2 is a diagram illustrating one embodiment of a first scroll bar displayed in a digital device. As shown in FIG. 2, if the digital device according to one embodiment detects an input signal for its front side 210, it may activate a first scroll bar 211 related to contents which are displayed.

At this time, the procedure of activating the first scroll bar 211 in the digital device may include displaying the first scroll bar 211 to allow the user to recognize the first scroll bar. Also, for convenience of description, the scroll bar activated in accordance with the input signal for the front side will hereinafter be referred to as 'the first scroll bar'.

The digital device may locate the first scroll bar 211 at a right side or the bottom of a window where contents are displayed, in accordance with a direction of the digital device based on grip of the user. Accordingly, the first scroll bar may include a horizontal scroll bar that moves the displayed contents in left and right directions, and vertical scroll bar that moves the displayed contents up and down. In FIG. 2, the vertical scroll bar is shown as one embodiment of the first scroll bar 211.

Also, the first scroll bar 211 may indicate a relative location of a displayed portion of the entire contents. In other words, when the contents cannot be displayed on the screen of the front side 210 fully, the first scroll bar 211 may indicate where the displayed portion of the entire contents is located in the entire contents.

Figure 3:
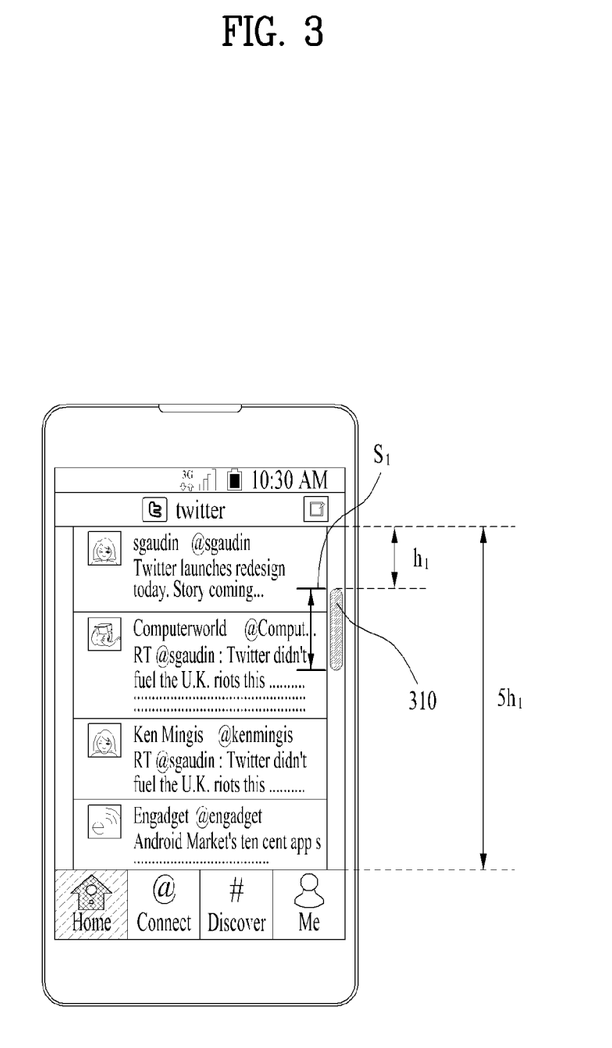
FIG. 3 is a diagram illustrating that a first scroll bar indicates a relative location in accordance with one embodiment.

FIG. 3 is a diagram illustrating that a first scroll bar indicates a relative location in accordance with one embodiment.

The user may view a displayed portion of the entire contents, which is currently displayed. Accordingly, the user needs to where the currently displayed portion is located in the entire contents. Accordingly, the digital device may indicate a relative location of the displayed portion of the entire contents by using the location of the first scroll bar 310 displayed in the window. At this time, the displayed location of the first scroll bar 310 means the place where the first scroll bar 310 is located in the path from the top of the window to the bottom of the window, if the first scroll bar 310 is the vertical scroll bar as shown in FIG. 3.

As shown in FIG. 3, if the first scroll bar 310 is the vertical scroll bar, the user may move the first scroll bar 310 between the top of the window and the bottom of the window. Accordingly, considering a distance of the first scroll bar 310 $h_l$ away from the top of the window and a distance 5 $h_1$ where the first scroll bar 310 may be moved, the user may know the relative location of the displayed portion of the entire contents, which is currently displayed. In FIG. 3, the user may note from the location of the first scroll bar 310 that the currently displayed portion is the point corresponding to 2/5 of the entire contents.

Accordingly, the size of the first scroll bar 310 may be dependent on the amount of the entire contents. This is because that the size $S_1$ of the first scroll bar 310 may indicate the relative amount of the displayed portion of the entire contents.

In other words, if the size of the first scroll bar 310 is great, a rate of the displayed portion that occupies the entire contents may be great. If the size of the first scroll bar 310 is small, the rate of the displayed portion that occupies the entire contents may be small. In this case, in the size of the scroll bar, the vertical scroll bar means the vertical length of the scroll bar, and the horizontal scroll bar means the horizontal length of the scroll bar.

Accordingly, the user may easily recognize that the entire contents may correspond to five times of the amount of the currently displayed portion.

As described above, if the user scrolls the contents displayed through the input for the front side, the digital device may display the first scroll bar together with the contents, whereby the user may recognize that the currently displayed portion corresponds to which portion of the entire contents.

Figure 4:
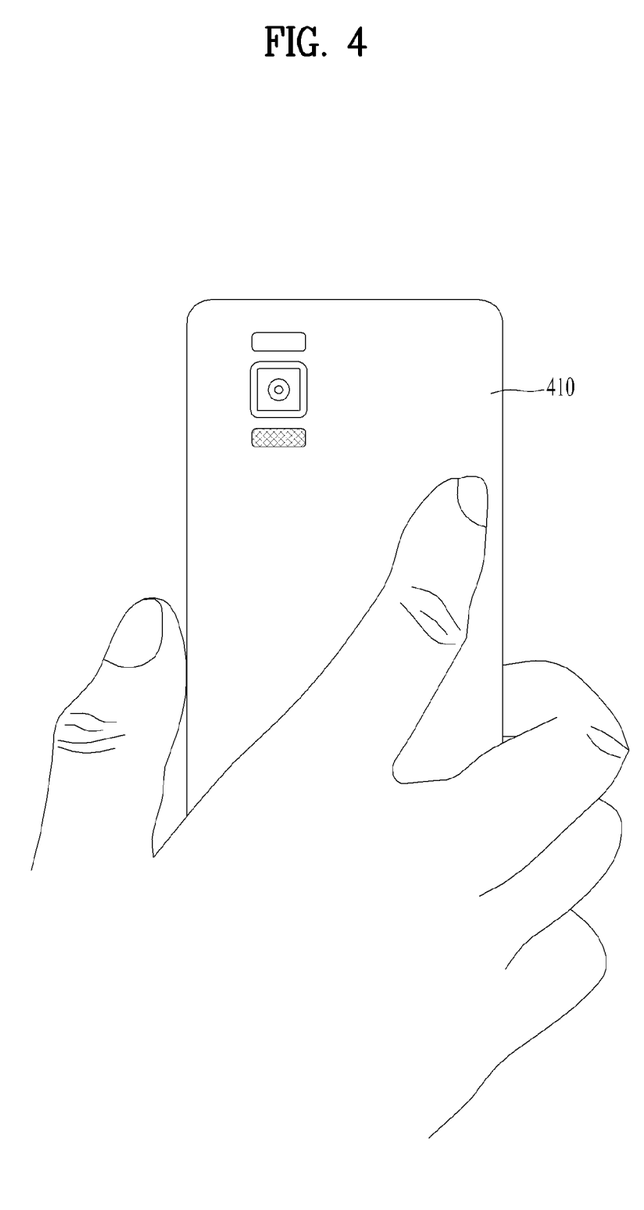
FIG. 4 is a diagram illustrating that a digital device activates a second scroll bar in accordance with one embodiment.

In the meantime, FIG. 4 is a diagram illustrating that a digital device activates a second scroll bar in accordance with one embodiment. As shown in FIG. 4, the digital device according to one embodiment may activate the scroll bar related to the controls displayed on the front side if it detects the input signal for the rear side 410.

At this time, the input signal may include a touch signal or hovering signal for the rear side 410. Hovering means that a touch means such as the hand of the user stays at a certain distance from a point where the user desires to touch. Also, the input signal may include all the signals based on a single touch, a multi-touch, a touch and drag, and a pinch.

In other words, if the digital device detects the input signal for the rear side 410 when displaying contents on the front side, it may provide a scroll bar that may scroll the contents displayed on the front side. However, the scroll bar provided by the digital device in accordance with the input signal for the rear side may be different from the first scroll bar. Hereinafter, the scroll bar activated in accordance with the input signal for the rear side will be referred to as "the second scroll bar". The second scroll bar will be described in more detail with reference to FIG. 6.

Figure 5:
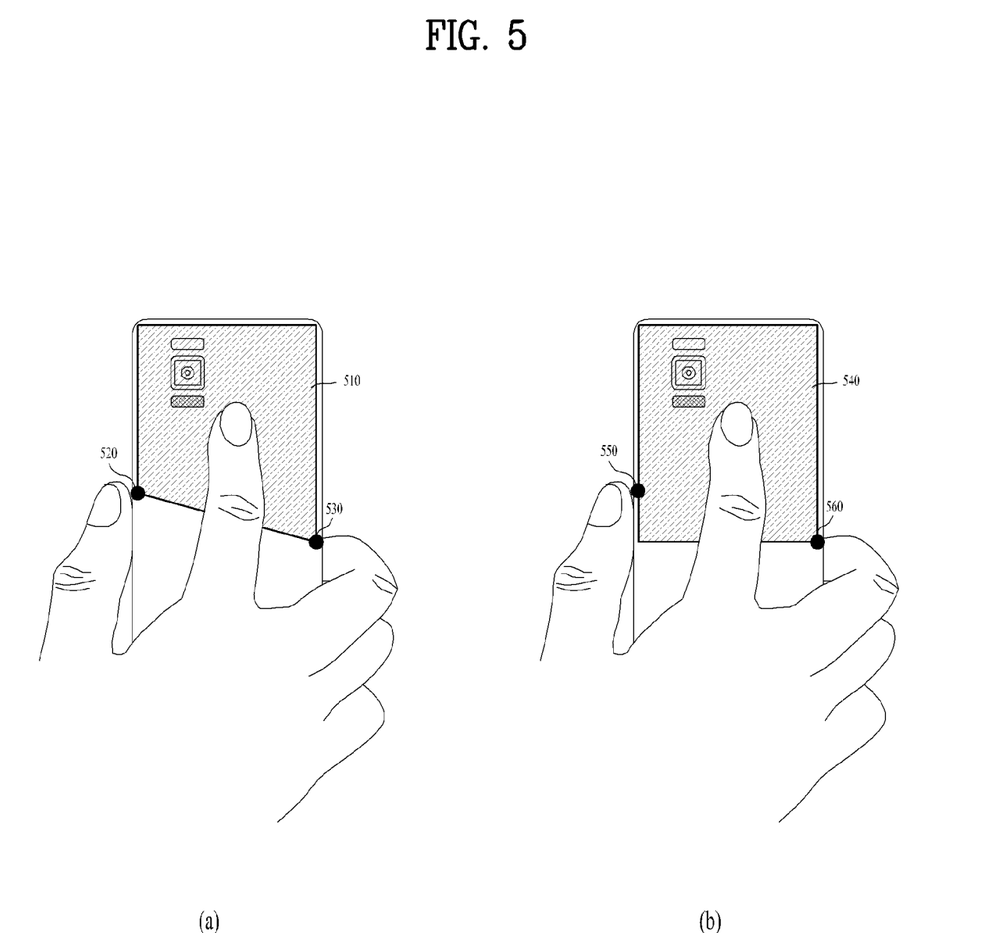
FIG. 5 is a diagram illustrating that a digital device configures a touch sensing zone depending on a grip pattern of a user in accordance with one embodiment.

FIG. 5 is a diagram illustrating that a digital device configures a touch sensing zone depending on a grip pattern of a user in accordance with one embodiment. In more detail, FIG. 5 illustrates a rear side of the digital device when the user grips the digital device with his/her right hand. The digital device according to one embodiment may recognize a touch at the front side and the rear side, that is, both sides.

The user of the digital device may mainly use the digital device by gripping the digital device with his/her one hand, especially if the digital device is a mobile device.

Accordingly, the digital device according to one embodiment may recognize a touch for some zone only by controlling a touch sensing zone in accordance with a grip of the user if it provides a scroll bar in accordance with the input signal for the rear side. In other words, the digital device may detect the input signal based on the touch for some zone only of the rear side instead of the entire zone of the rear side. Also, the digital device may control the zone for detecting the input signal based on the touch in accordance with the grip of the user.

To this end, the digital device may first identify a grip pattern based on the hand of the user. For example, the digital device may identify the grip pattern through the sensor unit, which senses the pressure for the side of the digital device. The digital device may determine the touch sensing zone of the rear side on the basis of the identified grip pattern.

For example, as shown in (a) of FIG. 5, the touch sensing zone 510 of the rear side of the digital device may be determined on the basis of a location of a first point 520 at a first side and a location of a second point 530 at a second side opposite to the first side. In other words, the touch sensing zone 510 may correspond to an upper zone on the basis of a line that connects the first point 520 with the second point 530 on the rear side of the digital device.

At this time, the first point 520 and the second point 530 may be determined on the basis of the grip pattern. Also, the second point 530 may include the uppermost point of at least one point for the second side of the identified grip pattern.

Alternatively, as shown in (b) of FIG. 5, the touch sensing zone 540 of the rear side of the digital device may be determined on the basis of at least one of a location of a first point 550 at a first side and a location of a second point 560 at a second side opposite to the first side. For example, the touch sensing zone 540 may correspond to an upper zone on the basis of the second point 560 located to be lower than the first point 550 on the rear side of the digital device. However, unlike (b) of FIG. 5, the touch sensing zone 540 may correspond to an upper zone on the basis of the first point 550 located to be higher than the second point 560.

As described above, the digital device may control the contents displayed on the front side to correspond to the input signal for the touch sensing zone by configuring the touch sensing zone. However, the touch sensing zones 510 and 540 of the rear side of the digital device may be smaller than the size of the window or screen where the contents are displayed on the front side. In this case, the digital device may not match the touch sensing zones 510 and 540 of the rear side with the size of the window or screen on the front side at a rate of 1:1. Accordingly, the digital device may control a scrolling level based on the input signal in accordance with a size rate between the sensing zones 510 and 540 of the rear side and the window or screen of the front side.

For example, the digital device may control the entire zone of the front side by scaling the input signal for the touch sensing zone. For another example, if a length of a touch input for the touch sensing zone of the rear side is 'a', the digital device may scroll the second scroll bar on the front side at a length of 2a.

In the meantime, if the digital device detects the input signal for the rear side, it may activate the second scroll bar. The procedure of activating the second scroll bar in the digital device may include displaying the second scroll bar to allow the user to recognize the second scroll bar.

Also, the digital device may sense the input based on a touch, drag or sliding of the user and scroll the contents in accordance with the sensed result. At this time, the digital device may scroll the contents to correspond to a speed of the touch, drag of sliding of the user and move the second scroll bar. At this time, the second scroll bar may indicate the scrolling speed of the displayed contents.

Figure 6:
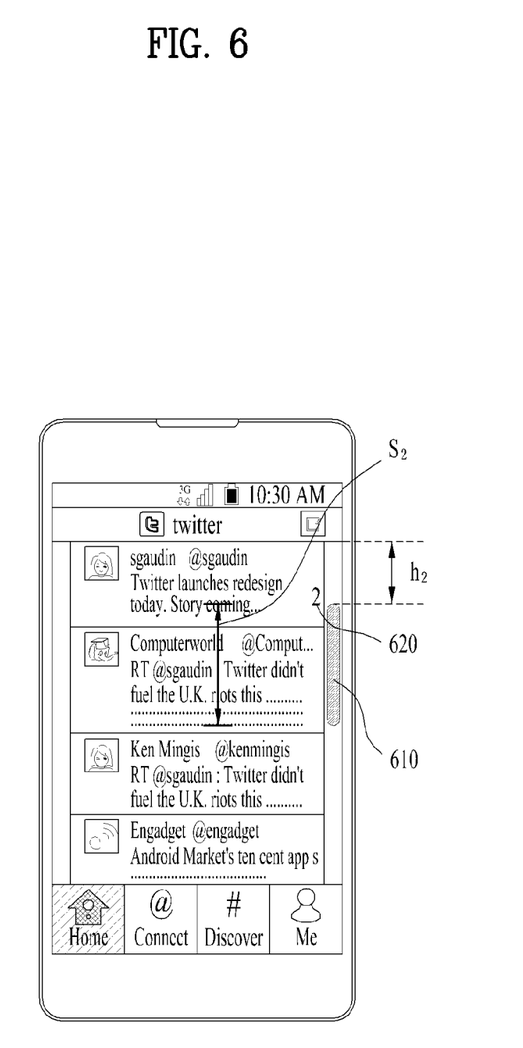
FIG. 6 is a diagram illustrating that a second scroll bar indicates a scrolling speed of contents in accordance with one embodiment.

FIG. 6 is a diagram illustrating that a second scroll bar indicates a scrolling speed of contents in accordance with one embodiment.

As described above, the first scroll bar may indicate the relative location of the displayed portion of the entire contents. Accordingly, if the first scroll bar is the vertical scroll bar, the user may know the relative location of the displayed portion of the entire contents, which is currently displayed, by considering the distance of the first scroll bar away from the top of the window and the distance where the first scroll bar may be moved. Accordingly, the size of the first scroll bar may be dependent on the amount of the entire contents.

However, the second scroll bar 610 is different from the first scroll bar. In other words, the second scroll bar 610 does not indicate the relative location of the displayed portion of the entire contents. Accordingly, if the second scroll bar 610 is the vertical scroll bar, the distance $h_2$ away from the top does not imply the relative location at the entire contents. The second scroll bar 610 may indicate the scrolling speed of the displayed contents.

The scrolling speed means the speed of the contents moved vertically (in case of the vertical scroll bar) or horizontally (in case of the horizontal scroll bar) to correspond to the input such as a touch, sliding or drag of the user. Accordingly, the digital device may display the size $S_2$ of the second scroll bar 610 within the great range if the scrolling speed is slow, and may display the size $S_2$ of the second scroll bar 610 within the small range if the scrolling speed is fast. In this case, since the second scroll bar 610 is the vertical scroll bar, its size $S_2$ means the vertical length of the scroll bar.

However, if the size $S_2$ of the second scroll bar 610 indicates the scrolling speed of the contents, it may be difficult for the user to estimate the speed by using only the size $S_2$ of the second scroll bar 610. Accordingly, the digital device may separately indicate the scrolling speed of the second scroll bar. For example, the digital device may display the number of lines (620) scrolled in accordance with the input signal based on a touch, sliding or drag in a specific direction.

As described above, the size $S_2$ of the second scroll bar 610 may indicate the scrolling speed. Accordingly, the size $S_2$ of the second scroll bar 610 may be independent from the amount of the contents unlike the size of the first scroll bar.

In the meantime, the second scroll bar may indicate the direction scrolled in accordance with the input of the user. However, since the size $S_2$ of the second scroll bar 610 is independent from the amount of the contents, if the contents are scrolled downwardly in accordance with the input signal of the user, even though the second scroll bar 610 is located on the bottom of the window, there may be contents which are not displayed downwardly. Accordingly, if the second scroll bar 610 is located on the bottom of the window, the digital device may display the contents by controlling the location of the second scroll bar 610 towards the top of the window.

On the other hand, even though the second scroll bar 610 is located on the top of the window, there may be contents which are not displayed upwardly. Accordingly, if the second scroll bar is located on the top of the window, the digital device may display the contents by controlling the location of the second scroll bar 610 towards the bottom of the window.

As described above, if the second scroll bar 610 is located at one side of the window, the digital device may control the scroll bar 610 to the predetermined location.

However, even at this time, if the second scroll bar is located on the top or the bottom of the window where the contents are displayed, a problem occurs in that it is difficult for the user to know whether the contents which are not displayed. In other words, although the user may know that there are contents which are not displayed, by scrolling the scroll bar on the top or the bottom, the user has a difficulty in recognizing that there are contents which are not displayed, before scrolling the scroll bar. Accordingly, the digital device may provide the window through modification.

Figure 7:
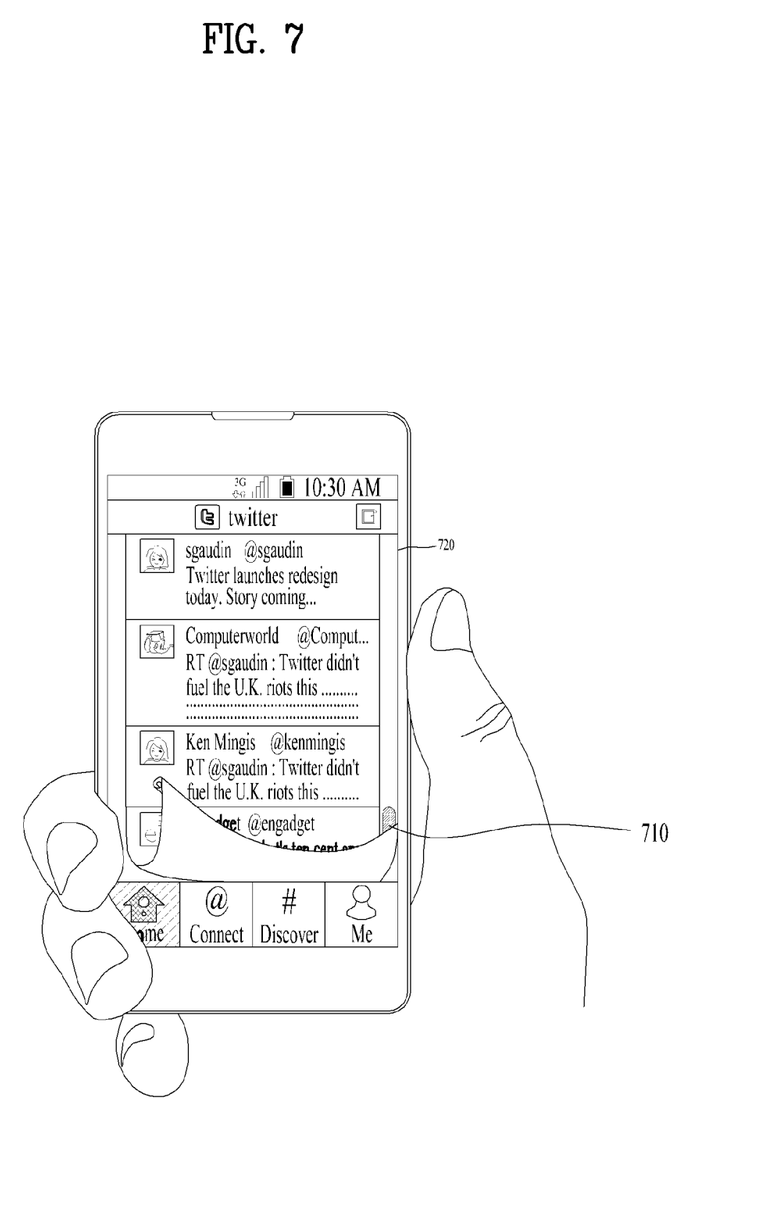
FIG. 7 is a diagram illustrating that a digital device provides a window by modifying the window depending on a location of a second scroll bar in accordance with one embodiment.

FIG. 7 is a diagram illustrating that a digital device provides a window by modifying the window depending on a location of a second scroll bar in accordance with one embodiment.

If the second scroll bar is located on the bottom of the window where the contents are displayed, the digital device may detect that the contents, which are not displayed downwardly, remain. However, since the user does not know how to view the contents which are not displayed and the second scroll bar is located on the bottom of the window, the user may have a difficulty in recognizing that there are contents which are not displayed. Accordingly, when the second scroll bar 710 is located on the bottom of the window, the digital device may display the contents by modifying the bottom of the window 720 where the contents are displayed, whereby the user may recognize that the contents which are not displayed remain.

In other words, although the second scroll bar 710 is located on the bottom of the window, if there are the contents which are not displayed downwardly, the digital device may display the contents by modifying the bottom of the window. As shown in FIG. 7, the digital device may display the contents in a state that the window is folded or wound, whereby the user may recognize that the contents which are not displayed remain. Although the second scroll bar 710 is located on the top of the window, if there are the contents which are not displayed upwardly, the digital device may display the contents by modifying the top of the window.

Figure 8:
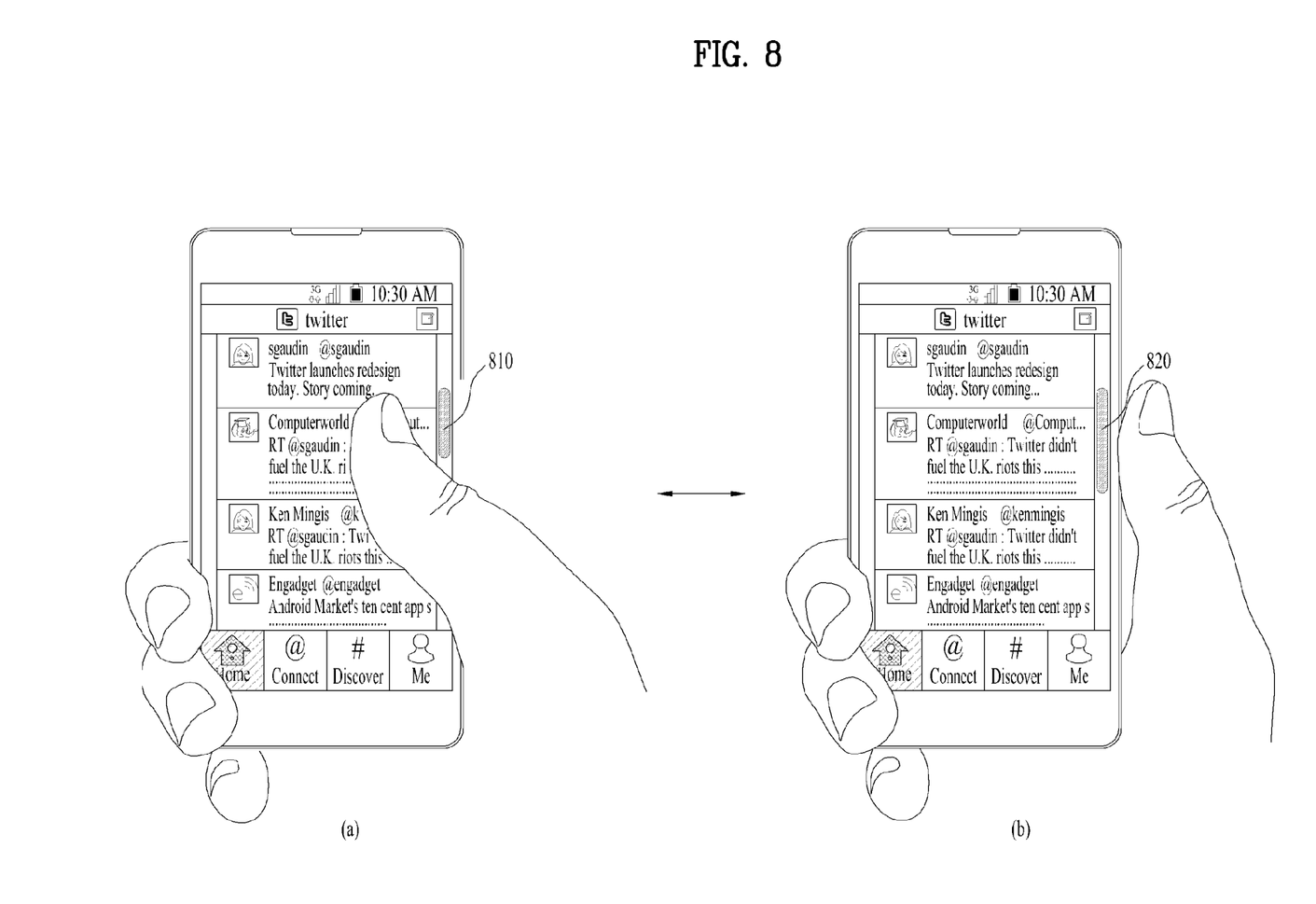
FIG. 8 is a diagram illustrating that a first scroll bar and a second scroll bar are activated or deactivated in a digital device depending on a touch input of a user in accordance with other embodiment.

FIG. 8 is a diagram illustrating that a first scroll bar and a second scroll bar are activated or deactivated in a digital device depending on a touch input of a user in accordance with other embodiment.

As shown in (a) of FIG. 8, if the digital device detects the input signal for the front side, it may activate a first scroll bar 810. As described above, the first scroll bar 810 may indicate the relative location of the displayed portion of the entire contents, and its size may be independent from the amount of the contents.

Also, if the digital device activates the first scroll bar 810, it may deactivate a second scroll bar 820. This is because that two scroll bars for the same contents may cause confusion of the user.

However, even though the first scroll bar 810 is activated, as shown in (b) of FIG. 8, if the digital device detects the input signal for the rear side, it may activate the second scroll bar 820. As described above, the second scroll bar 820 may indicate the scrolling speed of the contents, and its size may be independent from the amount of the contents.

The user input for the rear side of the digital device may be interpreted to be intended to control the contents displayed on the front side through the touch input for the rear side. Accordingly, if the digital device activates the second scroll bar 820, it may deactivate the first scroll bar 810.

However, if a predetermined time period passes after the digital device detects the input signal of the user for the rear side, the digital device may deactivate the second scroll bar 820. This is because that the user mainly uses the digital device such as a mobile device in a state that the user grips the digital device with his/her hand.

In other words, the user may stably use the digital device by supporting the rear side of the digital device through his/her hand. Accordingly, if there is a touch of the user for the rear side to support the digital device, it may not be regarded as the input signal for controlling the contents displayed on the front side. Accordingly, if the digital device continues to detect the input signal of the user for the rear side after a predetermined time period passes, the digital device may deactivate the activated second scroll bar 820.

Also, the digital device may make the scrolling speed based on the input signal for the rear side slower than the scrolling speed based on the input signal for the front side. In other words, if the second scroll bar 820 is activated, the digital device may make the scrolling speed slower than that provided when the first scroll bar 810 is activated.

If the user scrolls the displayed contents by using the rear touch input, it may be interpreted that the user has scrolled the contents displayed on the front side to view the contents in detail. This is because that the user's view may be interrupted by the touch means if the user uses the front touch input. Accordingly, if the user uses the rear touch input, the digital device may make the scrolling speed slow, whereby the user may view the contents more slowly and in detail.

Accordingly, the digital device may display the size of the second scroll bar 820, which indicates the scrolling speed, to be greater than that of the first scroll bar. At this time, the digital device may display the size of the second scroll bar 820 to be greater than that of the first scroll bar 810 on the basis of a ratio of the scrolling speed based on the input signal for the rear side to a scrolling speed based on the input signal for the front side.

As described above, the digital device may make the scrolling speed based on the input signal for the rear side to be slower than the scrolling speed based on the input signal for the front side. As a result, the user may roughly control the contents displayed through the front touch input, and may delicately control the contents displayed through the rear touch input.

According to another embodiment, as shown in (a) of FIG. 8, if the first scroll bar 810 is activated, the digital device may scroll the contents in accordance with the input signal for the front side. At this time, the digital device may move the first scroll bar to correspond to scrolling of the contents, whereby the user may identify the relative location of the currently displayed portion of the entire contents. However, the user cannot control the first scroll bar 810 directly to scroll the contents.

By contrast, as shown in (b) of FIG. 8, if the second scroll bar 820 is activated, the digital device may move the second scroll bar 820 not the contents, in accordance with the input signal for the rear side. At this time, the digital device may control the scrolling speed of the contents displayed in accordance with the moving speed of the second scroll bar 820.

In other words, the user may allow the displayed contents to be scrolled in accordance with the moving speed of the second scroll bar 820 by moving the second scroll bar 820. In this case, the user may roughly control the displayed contents by using the second scroll bar 820.

At this time, the digital device may detect the input signal for a specific zone of a rear touch sensing zone as the signal for moving the second scroll bar 820. For example, the digital device may detect the input signal for a given zone of a left side or a right side in the rear touch sensing zone as the signal for moving the second scroll bar 820, and may detect the input signal for the other zone as the signal for scrolling the contents.

In this case, if the user desires to roughly view the contents or quickly scroll the contents, the user may control the second scroll bar by touching a given zone of the left side or the right side. Also, if the user desires to view the contents in detail or scroll the contents slowly, the user may control the second scroll bar by touching the other touch sensing zone except for the given zone of the left side or the right side. In other words, if the user controls the contents displayed on the front side and the second scroll bar through the rear side, the user may touch the zones differently in accordance with his/her intention, whereby different effects may be obtained.

Figure 9:
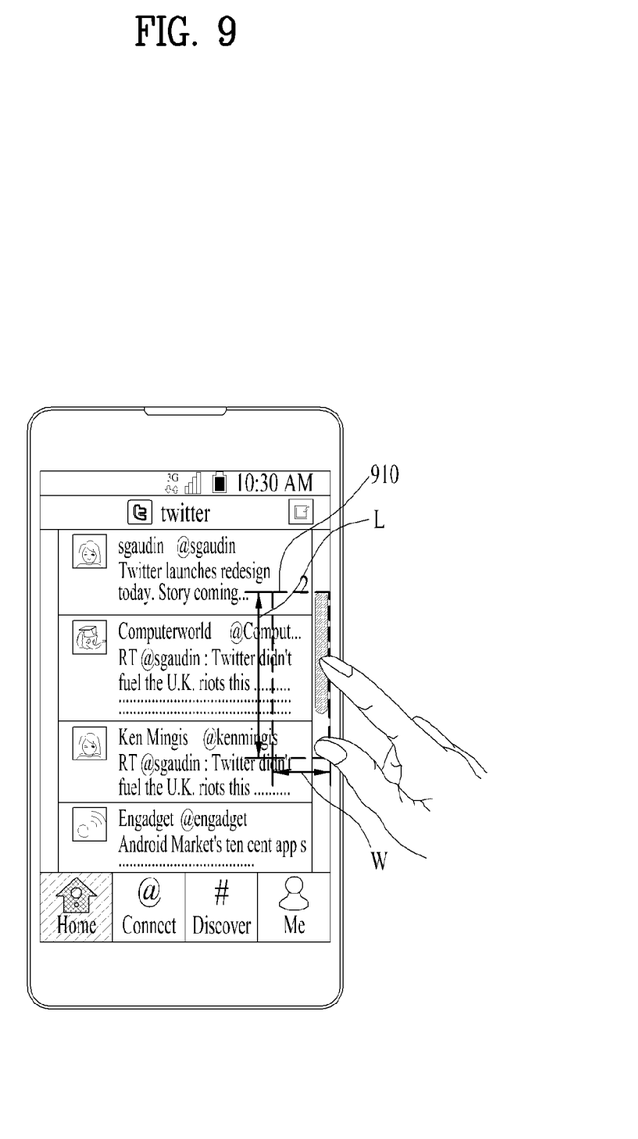
FIG. 9 is a diagram illustrating a user interface that adjusts a size of a second scroll bar in accordance with one embodiment.

In the meantime, the digital device according to one embodiment may provide a user interface that adjusts the size of the second scroll bar. FIG. 9 is a diagram illustrating a user interface that adjusts a size of a second scroll bar in accordance with one embodiment.

As described above, the size of the second scroll bar may indicate the scrolling speed of the contents in accordance with the input signal. Accordingly, the digital device may provide a user interface 910 that may allow the user to control the scrolling speed of the contents.

If the digital device detects an input signal for enlarging a length L of the second scroll bar for the user interface 910, it may adjust the scrolling speed of the second scroll bar to be slower than the scrolling speed which is previously set. However, in the example of FIG. 9, the second scroll bar is the vertical scroll bar. Accordingly, if the second scroll bar is the horizontal scroll bar, the digital device may adjust the scrolling speed of the second scroll bar to be slower than the previously set scrolling speed by detecting an input signal for enlarging a width W of the second scroll bar for the user interface 910.

Figure 10:
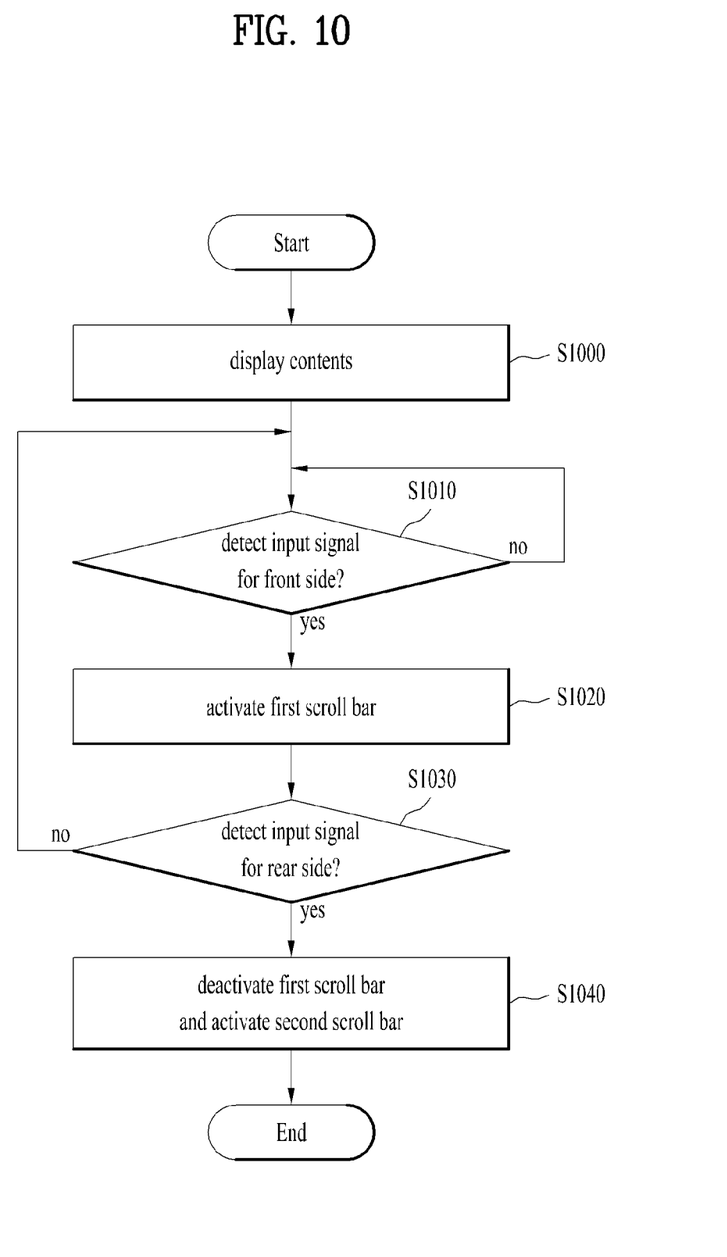
FIG. 10 is a flow chart illustrating a method for controlling a digital device in accordance with one embodiment.

FIG. 10 is a flow chart illustrating a method for controlling a digital device in accordance with one embodiment. Each step of FIG. 10, which will be described hereinafter, may be controlled by the processor 150 of the digital device 100 shown in FIG. 1.

First of all, the digital device that enables double-sided touch recognition may display contents (S1000). As described with reference to FIG. 2, the digital device may detect whether there is an input signal for the front side (S1010). Also, as described with reference to FIG. 4, if the digital device detects the input signal for the front side, it may activate the first scroll bar (S1020).

The first scroll bar may indicate the relative location of the displayed portion of the entire contents. Also, the size of the first scroll bar may be dependent on the amount of the contents.

As described with reference to FIG. 4, the digital device may detect whether there is an input signal for the rear side (S1030). Also, as described with reference to FIG. 6 and FIG. 8, if the digital device detects the input signal for the rear side, it may deactivate the first scroll bar and activate the second bar (S1040).

The second scroll bar may indicate the scrolling speed of the contents. Also, the size of the second scroll bar may independent from the amount of the contents.

The digital device may adjust the scrolling speed based on the input signal for the rear side to be slower than the scrolling speed based on the input signal for the front side. At this time, the digital device may display the size of the second scroll bar to be greater than that of the first scroll bar on the basis of a ratio of the scrolling speed based on the input signal for the rear side to a scrolling speed based on the input signal for the front side.

Figure 11:
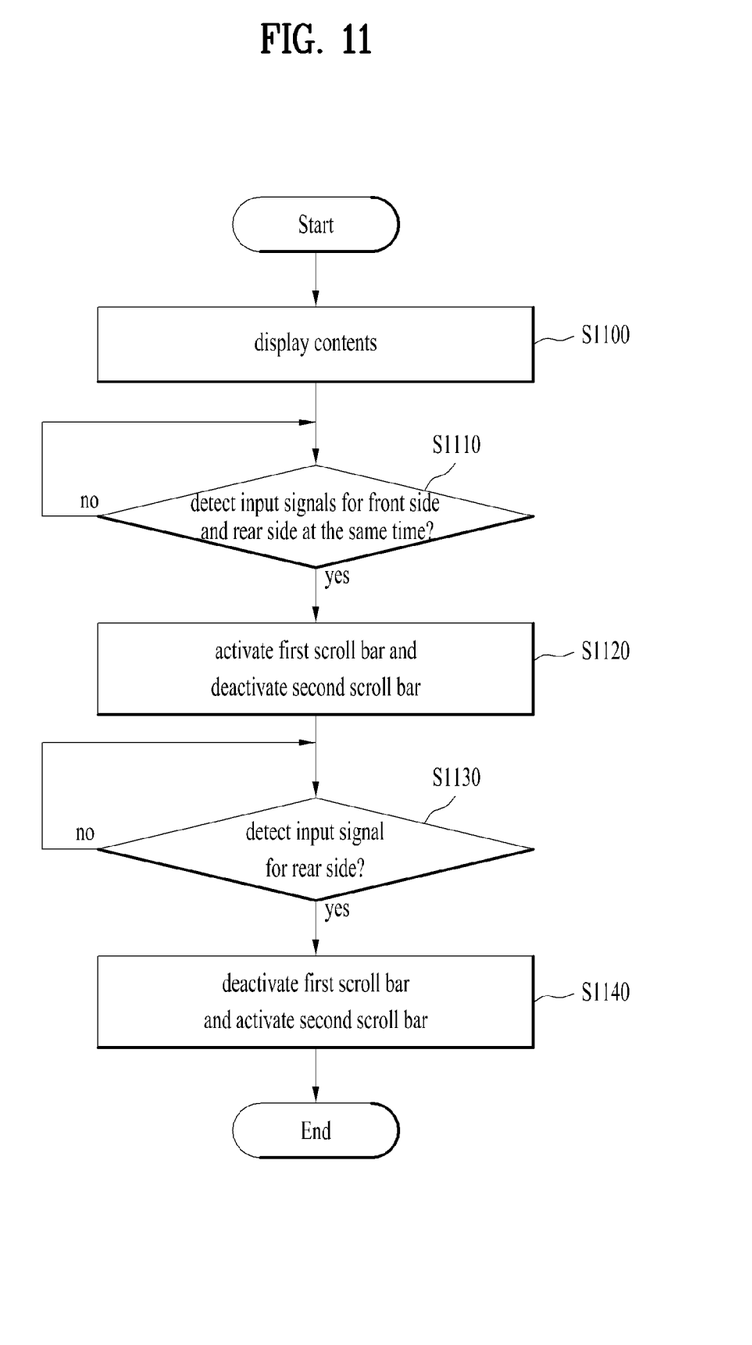
FIG. 11 is a flow chart illustrating a method for controlling a digital device in accordance with another embodiment.

FIG. 11 is a flow chart illustrating a method for controlling a digital device in accordance with another embodiment. Each step of FIG. 11, which will be described hereinafter, may be controlled by the processor 150 of the digital device 100 shown in FIG. 1.

First of all, the digital device may display the contents (S1100). At this time, since the digital device may recognize double-sided touch, it may detect the input signals for the front side and the rear side at the same time (S1110). If the digital device detects the input signal for the front side and the input signal for the rear side at the same time, it may first process the input signal for the front side or the input signal for the rear side in accordance with the set rule.

In other words, if the digital device detects the input signal for the front side and the input signal for the rear side at the same time, it may activate the first scroll bar and deactivate the second scroll bar. Alternatively, if the digital device detects the input signal for the front side and the input signal for the rear side at the same time, it may activate the second scroll bar and deactivate the first scroll bar. In FIG. 11, the input signal for the front side is first processed, wherein the first scroll bar is activated while the second scroll bar is deactivated.

Accordingly, the digital device that has detected the input signal for the front side and the input signal for the rear side may activate the first scroll bar as described in FIG. 2, and may deactivate the second scroll bar (S1120). However, even though the first scroll bar or the second scroll bar is activated, the digital device may continue to detect the input signal for the rear side or the front side. Accordingly, as described with reference to FIG. 4, the digital device may detect whether there is the input signal for the rear side (S1130).

As described with reference to FIG. 8, if the digital device detects the input signal for the rear side, it may deactivate the activated first scroll bar and activate the second scroll bar (S1140). This is because that two scroll bars for the same contents may cause confusion of the user.

Moreover, although the description may be made for each of the drawings, the embodiments of the respective drawings may be incorporated to achieve a new embodiment. A computer readable recording medium where a program for implementing the embodiments is recorded may be designed in accordance with the need of the person skilled in the art within the scope of the present specification.

Also, the digital device and the method for controlling the same according to one embodiment are not limited to the aforementioned embodiments, and all or some of the aforementioned embodiments may selectively be configured in combination so that various modifications may be made in the aforementioned embodiments.

In the meantime, the method for controlling the digital device may be implemented in a recording medium, which can be read by a processor provided in the network device, as a code that can be read by the processor. The recording medium that can be read by the processor includes all kinds of recording media in which data that can be read by the processor are stored. Examples of the recording medium include ROM, RAM, CD-ROM, magnetic tape, floppy disk, and optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

In this specification, both the product disclosure and the method disclosure have been described, and description of both may be made complementally if necessary.

What is claimed is:

1. A digital device that enables double-sided touch recognition, the digital device comprising:
a display unit configured to display contents;
a sensor unit configured to sense a user input and transfer a signal based on the sensed result to a processor; and
the processor configured to control the display unit and the sensor unit,
wherein the processor is further configured to:
activate a first scroll bar when a first input signal for a front side is detected, wherein the first scroll bar indicates a relative location of a displayed portion of entire contents and a size of the first scroll bar is dependent on an amount of the contents,
activate a second scroll bar when a second input signal for a rear side is detected, wherein the second scroll bar indicates a scrolling speed corresponding to the second input signal and a size of the second scroll bar is independent from the amount of the contents and is determined based on the scrolling speed corresponding to the second input signal,
change the size of the second scroll bar based on a change in the scrolling speed corresponding to the second input signal in response to detecting the change in the scrolling speed corresponding to the second input signal,
deactivate the second scroll bar if the first scroll bar is activated, and
deactivate the first scroll bar if the second scroll bar is activated.

2. The digital device according to claim 1, wherein the processor adjusts a scrolling speed according to a third input signal for the rear side to be slower than a scrolling speed according to a fourth input signal for the front side.

3. The digital device according to claim 2, wherein the processor displays the size of the second scroll bar to be greater than the size of the first scroll bar on the basis of a ratio of the scrolling speed according to the third input signal to the scrolling speed according to the fourth input signal.

4. The digital device according to claim 1, wherein the processor deactivates the activated second scroll bar if a predetermined time period passes after detecting the second input signal for the rear side.

5. The digital device according to claim 1, wherein the processor scrolls the contents according to a fifth input signal for the front side, and moves the first scroll bar to indicate the relative location of the displayed portion of the entire contents.

6. The digital device according to claim 1, wherein the processor moves the second scroll bar according to a sixth input signal for the rear side, and adjusts a scrolling speed for the displayed contents corresponding to the moving speed of the second scroll bar.

7. The digital device according to claim 6, wherein the sixth input signal for the rear side is detected when a user input for a specific zone of the rear side is sensed.

8. The digital device according to claim 1, wherein the processor adjusts a location of the second scroll bar to a predetermined location when the second scroll bar is located at one side of a window where the contents are displayed.

9. The digital device according to claim 1, wherein the processor provides a user interface to adjust the size of the second scroll bar.

10. The digital device according to claim 9, wherein the processor adjusts the scrolling speed by the second scroll bar to be slower than a predetermined scrolling speed if a seventh input signal for enlarging a length of the second scroll bar for the user interface is detected.

11. The digital device according to claim 1, wherein the processor activates the first scroll bar and deactivates the second scroll bar when the first input signal for the front side and the second input signal for the rear side are detected at the same time.

12. The digital device according to claim 1, wherein the processor activates the second scroll bar and deactivates the first scroll bar when the first input signal for the front side and the second input signal for the rear side are detected at the same time.

13. A method for controlling a digital device that enables double-sided touch recognition, the method comprising:
displaying contents;
activating a first scroll bar when a first input signal for a front side is detected, wherein the first scroll bar indicates a relative location of a displayed portion of entire contents and a size of the first scroll bar is dependent on an amount of the contents;
activating a second scroll bar when a second input signal for a rear side is detected, wherein the second scroll bar indicates a scrolling speed corresponding to the second input signal and a size of the second scroll bar is independent from the amount of the contents and is determined based on the scrolling speed corresponding to the second input signal; and
changing the size of the second scroll bar based on a change in the scrolling speed corresponding to the second input signal in response to detecting the change in the scrolling speed corresponding to the second input signal,
wherein the step of activating the first scroll bar includes deactivating the second scroll bar, and the step of activating the second scroll bar includes deactivating the first scroll bar.

14. The method according to claim 13, further comprising adjusting a scrolling speed according to a third input signal for the rear side to be slower than a scrolling speed according to a fourth input signal for the front side.

15. The method according to claim 14, wherein the adjusting the scrolling speed according to the third input signal includes displaying the size of the second scroll bar to be greater than the size of the first scroll bar on the basis of a ratio of the scrolling speed according to the third input signal to the scrolling speed according to the fourth input signal.

16. The method according to claim 13, further comprising deactivating the activated second scroll bar if a predetermined time period passes after the second input signal for the rear side is detected.

17. The method according to claim 13, further comprising adjusting a location of the second scroll bar to a predetermined location when the second scroll bar is located at one side of a window where the contents are displayed.

18. The method according to claim 13, further comprising activating the first scroll bar and deactivating the second scroll bar when the first input signal for the front side and the second input signal for the rear side are detected at the same time.

19. The method according to claim 13, further comprising activating the second scroll bar and deactivating the first scroll bar when the first input signal for the front side and the second input signal for the rear side are detected at the same time.

20. The method according to claim 13, further comprising:
providing a user interface to adjust the size of the second scroll bar; and
adjusting the scrolling speed by the second bar to be slower than a predetermined scrolling speed if a fifth input signal for enlarging a length of the second scroll bar for the user interface is detected.

* * * * *